United States Patent
Glipa et al.

(10) Patent No.: US 9,614,240 B2
(45) Date of Patent: Apr. 4, 2017

(54) COOLING SYSTEM FOR A FUEL CELL

(75) Inventors: Xavier Glipa, Verneuil sur Seine (FR);
Guillaume Joncquet, La Celle Saint Cloud (FR); Eric Pinton, Echirolles (FR); Patrick Le Gallo, Saint Apolinard (FR); Sylvie Begot, Chaux (FR); Fabien Harel, Giromagny (FR); Jean-Marc Le Canut, Belfort (FR)

(73) Assignee: Commissariat A l'Energie Atomique Et Aux Energies Alternatives, Paris (FR)

( * ) Notice: Subject to any disclaimer, the term of this patent is extended or adjusted under 35 U.S.C. 154(b) by 756 days.

(21) Appl. No.: 13/981,568

(22) PCT Filed: Feb. 1, 2012

(86) PCT No.: PCT/FR2012/050222
§ 371 (c)(1),
(2), (4) Date: Aug. 21, 2013

(87) PCT Pub. No.: WO2012/104554
PCT Pub. Date: Aug. 9, 2012

(65) Prior Publication Data
US 2014/0017585 A1    Jan. 16, 2014

(30) Foreign Application Priority Data
Feb. 2, 2011  (FR) .................................. 11 50826

(51) Int. Cl.
*H01M 8/04007*  (2016.01)
*H01M 8/04701*  (2016.01)
(Continued)

(52) U.S. Cl.
CPC ... *H01M 8/04731* (2013.01); *H01M 8/04007* (2013.01); *H01M 8/04253* (2013.01);
(Continued)

(58) Field of Classification Search
None
See application file for complete search history.

(56) References Cited

U.S. PATENT DOCUMENTS

| 2005/0175875 | A1* | 8/2005 | Nelson | H01M 8/04029 429/429 |
| 2005/0271908 | A1 | 12/2005 | Lin | |
| 2013/0327291 | A1* | 12/2013 | Pett, Jr. | F02B 19/00 123/253 |

FOREIGN PATENT DOCUMENTS

| EP | 0074701 A1 | 3/1983 | |
| JP | 2005-322596 | * 11/2005 | H01M 8/04 |

(Continued)

OTHER PUBLICATIONS

International Search Report for corresponding application PCT/FR2012/050222 dated May 18, 2012.
(Continued)

*Primary Examiner* — Barbara Gilliam
*Assistant Examiner* — Angela Martin
(74) *Attorney, Agent, or Firm* — Polster, Lieder, Woodruff & Lucchesi, LC

(57) ABSTRACT

The invention relates to a cooling system for a fuel cell (2), comprising a main heat-transfer-fluid circuit including a main circulation pump (6) and a heat exchanger (8) with the exterior, which feed an upstream pipe (12) supplying the fluid to the cells (4) of the fuel cell, said fluid leaving the cells via a downstream pipe (14) in order to return to the main pump. The system is characterised in that a secondary circuit, comprising a secondary circulation device (30) that circulates the fluid in an alternate manner, is connected in parallel with the main circuit to the upstream (12) and downstream (14) pipes and in that one or more controlled
(Continued)

valves (10, 16) allow the main circuit and the secondary circuit to operate independently.

12 Claims, 3 Drawing Sheets

(51) Int. Cl.
*H01M 8/04223* (2016.01)
*H01M 8/0432* (2016.01)
*H01M 8/04537* (2016.01)
*H01M 8/04746* (2016.01)

(52) U.S. Cl.
CPC ... *H01M 8/04268* (2013.01); *H01M 8/04358* (2013.01); *H01M 8/04544* (2013.01); *H01M 8/04768* (2013.01); *B60L 2200/26* (2013.01); *Y02E 60/50* (2013.01)

(56) References Cited

FOREIGN PATENT DOCUMENTS

| JP | 2005322596 A | 11/2005 | |
|----|---|---|---|
| JP | 2009-245802 | * 10/2009 | ............. H01M 8/04 |
| JP | 2009245802 A | 10/2009 | |

OTHER PUBLICATIONS

Written Opinion for corresponding application PCT/FR2012/050222 with translation.

\* cited by examiner

COOLING SYSTEM FOR A FUEL CELL

CROSS-REFERENCE TO RELATED APPLICATIONS

This application is the US National Stage under 35 U.S.C. §371 of International Application Number PCT/FR2012/050222 filed on Feb. 1, 2012 which claims priority to French Application No. 1150826 which was filed on Feb. 2, 2011.

BACKGROUND

The present invention relates to a cooling system for a fuel cell that generates electricity and also to a process for the operation of such a cooling system as well as to an electricity-generating group and an automobile vehicle comprising a fuel cell equipped with this cooling system.

Fuel cells are developed today in particular as a replacement for internal combustion engines in vehicles. Fuel cells obtain a better yield of energy than that of internal combustion engines by producing electricity used by an electrical drive motor.

Fuel cells generally comprise a stack of elementary cells comprising two electrodes separated by an electrolyte, and two conductive plates that supply the fuel and the oxidizer to the electrodes by internal conduits. The electrochemical reactions that take place upon contact with the electrodes generate an electric current and produce water while releasing heat energy that heats the different components.

In order to function correctly the fuel cells must be at a certain temperature range, depending on the type, between 60 and 800° C. The heat released by the starting of the reactions when the cell is cold serves, at first, to heat the cells in order bring them to the desired operating temperature.

In order to regulate the temperature of the cells, the fuel cells comprise a cooling system comprising a heat-conveying fluid circuit put in circulation by a pump that comes in contact with the fuel cells in order to absorb heat while warming up. The fluid then circulates in a heat exchanger in order to cool down, in particular by exchange with the ambient air.

A problem that is posed when starting a fuel cell that is at a temperature lower than 0° C. is that the water produced by the electrochemical reaction is at risk of freezing as long as this temperature is below this threshold of 0° C.

The fuel cell can not function correctly below this threshold and risks being destroyed. In order to remedy this problem a known cooling system presented in particular in EP0074701 comprises a cooling circuit comprising a first circulation loop with the heat exchanger and a pump that always delivers in the same direction, and a second circulation loop that traverses the cells.

The two circulation loops in EP0074701 intersect at a single point at a four-way valve that can be placed in two positions. Two of the four ways always serve as the entrance and the exit for the first circulation loop, and the two other ways allow the second loop to be arranged in series with the first loop in order to receive a circulation in one direction for one position of the valve and in the other direction for the other position of the valve.

While the pump is delivering in the first loop in a continuous manner in one and the same direction, an automatic actuation of the four-way valve from one position to the other allows the direction of the passage of the heat-conveying fluid to be alternated in the second loop and therefore in the cells.

Thus, a cold frequent alternating of the direction of the circulation of the fluid in the cells is realized with a circulation of the same reduced volume of fluid traversing these cells in one direction then in the other direction. The same volume of fluid exits on one side of the cells as a function of the discharge of fluid and of the frequency of alternation in order to reenter thereagain after the changing of the direction of circulation. The changes of the direction of circulation of the fluid are produced with intervals of time between two directions of circulation that are rather short in order to not allow each part of the fuel cell to reach its point of thermal stability.

The implementation of a low volume of fluid comprising an alternating movement that exchanges and distributes heat allows for better homogenization of the temperature at all points of the cells and between the cells situated at the center of the stack and those at the ends relative to a homogenization obtained with a movement of fluid in a single direction. Thus, a concentration of the heat that remains in the cells and in the parts of the conduits close to these cells is obtained, as the fluid does not circulate beyond these close parts.

Thus, a more rapid starting and rise of temperature of the fuel cell can be obtained before having to dissipate heat to the outside by the continuous manner of operation comprising a single direction of passage in which the fluid traverses the cells and passes into the heat exchanger in order to cool down.

A problem that is posed with this cooling circuit is that it is then necessary to size the pump with a greater power in order to put the heat-conveying fluid in motion in an alternating manner in the second loop. It will be noted that the energy necessary for putting in motion this heat-conveying fluid becomes all the more significant if this fluid comprises an antifreeze such as ethylene glycol or fluorinated oil, which is more viscous.

The pump then has a more significant bulkiness, mass and cost.

Another problem posed by this cooling circuit is that the four-way valve is relatively complex and expensive to manufacture. Moreover, the two loops intersecting at a single point form a specific circuit that is not always easy to realize in a simple manner starting from a conventional circuit comprising a single main loop.

Moreover, the manner of regulating the sequence of the changing of the direction of the fluid is based on global characteristics of the fuel cell whereas in the starting at a low temperature there can be significant temperature differences inside this fuel cell. Therefore, it is very difficult to make a good choice of the value of the frequency.

SUMMARY

A simple and efficacious cooling circuit that permits a rapid starting of the fuel cell at low temperatures is disclosed which avoids the noted disadvantages prior art.

The disclosed cooling system for a fuel cell comprises a main circuit and a secondary circuit for a heat-conveying fluid. The main circuit comprises a main circulation pump and a heat exchanger with the outside that feeds an upstream conduit delivering the heat-conveying fluid to the cells of the fuel cell, which fluid exits from the cells via a downstream conduit in order to return to this main pump. The secondary circuit comprises a secondary circulation device that brings about an alternating circulation of the fluid that is connected in parallel to the main circuit on the upstream and downstream conduits. One or more controlled valves permit an independent operation of the main circuit or of the secondary circuit to be established.

An advantage of this cooling system is that the secondary circulation can be dedicated to the alternating circulation, with the secondary circulation device provided in a specific manner for this alternating circulation and with the main pump designed in a conventional manner for a circulation in only one direction.

The cooling system can furthermore comprise one or several of the following characteristics that can be combined with each other.

According to one embodiment, the one or more controlled valves comprise a single three-way valve arranged on a conduit upstream or downstream from the cells in order to direct the fluid to the main circuit or to the secondary circuit.

According to another embodiment, the one or more controlled valves comprise two three-way valves arranged on each of the upstream and downstream conduits of the cells in order to direct the fluid to the main circuit or to the secondary circuit.

According to another embodiment, the one or more controlled valves comprise one two-way valve on each upstream or downstream conduit arranged toward the main circuit and one two-way valve arranged toward the secondary circuit.

The secondary circulation device is advantageously a pump comprising a cylinder arranged in series in the conduit, comprising a piston delimiting two chambers, activated by an alternating motion in order to displace the heat-conveying fluid of the secondary circuit with an alternating movement.

Static mixers are advantageously arranged in the fluid circuit in the proximity of the fuel cells.

Also disclosed is a process for operating a cooling system comprising any one of the previous characteristics, controlling, as a function of the development of the temperature of the fuel cells, the frequency of the switching alternations of the controlled valves in order to alternatively establish the main circuit or the secondary circuit.

The alternation frequency is advantageously calculated for a given intensity of current delivered by the cells as a function of the development of the voltage on the terminals of these cells.

It is advantageous if two voltages are measured on the terminals of two groups of cells, one group located in a central zone and the other group in the end zones of the stack of cells, whereby the operating process can switch the controlled valves in order to establish the main circuit with the continuous operation mode when the voltage of the central cells is exceeded by the voltage of the end cells.

The invention also has as its subject matter an electricity-generating group with a fuel cell comprising a cooling system comprising any one of the previous characteristics.

Furthermore, the invention has as its subject matter an electric vehicle with a fuel cell delivering an electric current used for traction, which fuel cell comprises a cooling system comprising any one of the previous characteristics.

DESCRIPTION OF THE FIGURES

The invention will be better understood and other characteristics and advantages will appear more clearly from a reading of the following description given by way of example and in a non-limiting manner with reference made to the attached drawings in which.

DETAILED DESCRIPTION

Figure 1:
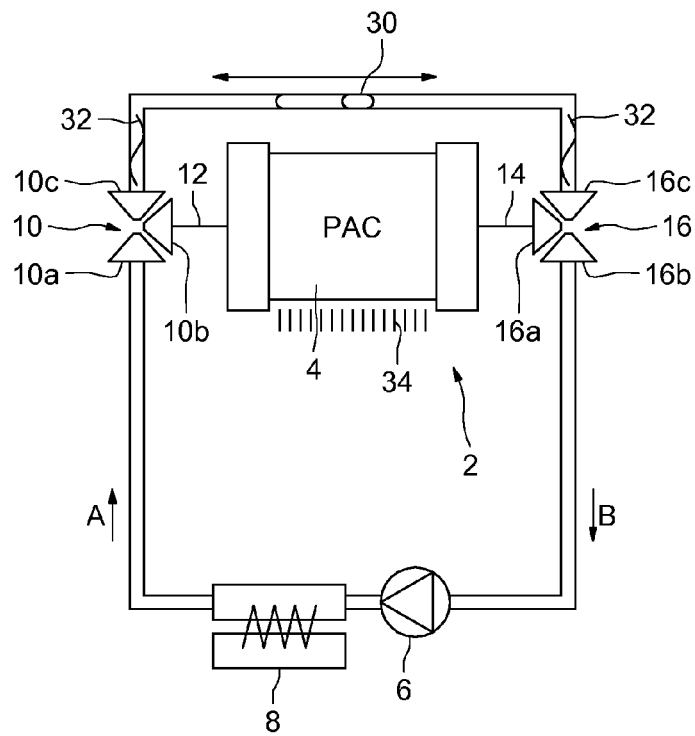
FIG. 1 is a diagram of a cooling system for a fuel cell.

FIG. 1 shows a fuel cell 2 comprising a series of cells 4 traversed by a heat-conveying fluid of a cooling system managed by a computer (not shown) controlling the cooling system, which can be the control computer for the fuel cell unit.

The cells 4 comprise electrical connections 34, provided at different locations in the stack, for measuring the voltage of the cells, and for allowing the control computer to monitor this voltage over the course of time.

The cooling system comprises in a main circuit a pump 6 comprising a single direction of rotation and generating a delivery of heat-conveying fluid that traverses a heat exchanger 8 in order to cool this fluid by exchange of heat with the ambient air.

In a mode of continuous operation of the cooling system, the heat-conveying fluid put in circulation by the pump 6 runs through the main circuit whose output is indicated by the arrow A and traverses an upstream three-way valve 10 by entering through the entrance 10a in order to exit through the exit 10b connected to the upstream conduit 12 of the cells 4 of the fuel cell.

The heat-conveying fluid then leaves the fuel cells 4 through a downstream conduit 14 and traverses a three-way upstream valve 16 by entering through the entrance port 16a and exiting through the exit port 16b that conducts this fluid toward the end of the main circuit indicated by the arrow B in order to return to the pump 6.

Therefore, a main circuit is obtained that comprises a single direction of circulation, that allows, in a continuous operation mode, the taking of heat into the cells 4 in order to evacuate the heat into the heat exchanger 8.

A secondary circuit arranged in parallel with the main circuit comprises a device for the circulation of the secondary fluid, comprised of, in this example, a secondary reciprocating pump 30 that comprises a cylinder arranged in series in the conduit. The cylinder comprises a piston delimiting two chambers arranged on opposite sides of the piston and that is activated by an alternating motion for displacing the heat-conveying fluid of this secondary circuit with an alternating motion.

The secondary reciprocating pump 30 comprises a tubular linear motor with continuous current that can be synchronous or asynchronous. The piston can also comprise a magnet put in motion by an electromagnetic bobbin receiving an alternating current.

As a variant, the piston of the secondary pump 30 can be driven by a crank-type driving system put in motion by a motor rotating in a continuous manner.

The ends of the secondary pump 30 are each connected to the third available port 10c, 16c, of each three-way valve 10, 16 in such a manner that when these two valves are switched, the main circuit is interrupted and the secondary circuit forms a closed loop joined to the upstream 12 and downstream 14 conduits of the cells 4.

The three-way valves 10, 16 are advantageously arranged close to the cells 4, and the secondary circuit comprises a reduced volume of heat-conveying fluid for facilitating its temperature rise and limiting the power necessary for putting this fluid with a high viscosity in motion.

It will be noted that the three-way valves 10, 16 are valves with an all or nothing simultaneous control that necessitates a simple and economical control.

In the case of starting the fuel cell at temperatures lower than 0° C. and in order to accelerate the rise in temperature of the cells in order to avoid a freezing of the water produced by the electrochemical reaction, the control computer of the cooling circuit switches the two three-way valves 10, 16 in order to close the main circuit and establish the secondary circuit, and activates the secondary pump 30 in order to make the heat-conveying fluid of this secondary circuit oscillate in accordance with small successive periods.

Thus, a secondary circuit is obtained with a minimum of modifications of a conventional main circuit by adding two simple and economical three-way valves 10, 16 and a reciprocating pump 30, which secondary circuit allows the heat-conveying fluid to circulate in the cells 4 in an alternating operational mode.

The alternating circulation of the same volume of fluid in the cells 4 allows the heat released by the electrochemical reaction to be concentrated in a low mass in order to limit losses and obtain a more rapid temperature rise while dividing the heat into the entire volume of the cells in order to homogenize the temperature and at the same time avoid hot points and cold points.

It is understood that when the frequency of alternation is increased, the volume of the fluid traversing the cells diminishes.

Moreover, the secondary circuit comprises static mixers 32 that are in the conduits and situated in the proximity of the three-way valves 10, 16, that form vortices in the conduits and aid the mixture of the heat-conveying fluid entering into and exiting from the cells 4, that comprise rather hot streams and others that are rather cold.

The static mixers 32 are mechanical pieces that can comprise different shapes such as helicoidal bars, lattices or pierced disks that separate the delivery of the fluid into several streams.

It will be noted that the secondary circulation device 30 with a piston provides for a simple and economical means for putting a heat-conveying fluid with a high viscosity in motion in an oscillating manner.

As a complement to realizing the control, the cooling system can comprise a temperature sensor arranged on one side of the cells 4 on the upstream conduit 12 or downstream conduit 14, or two sensors arranged with each one on a side of these cells.

Figure 2:
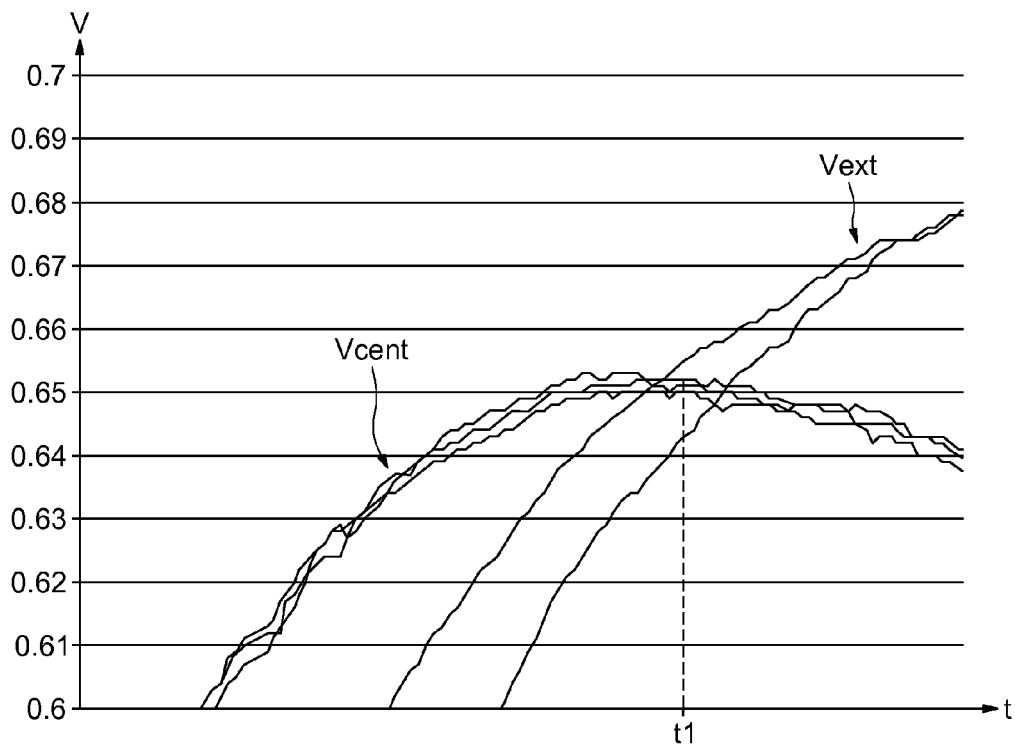
FIG. 2 is a graph showing the developments of the electrical voltage V on the terminals of the cells of this fuel cell as a function of the time t during a regulation by an alternating circulation of the fluid.

FIG. 2 illustrates a method of regulating the temperature of the fuel cells 4 by monitoring the voltage level V presented on the y-axis for the cells delivering a given intensity of the current as a function of the time t presented on the x-axis, measured by the measuring connections 34 on the one hand on a group of cells of a central zone Vcent, and on the other hand on a group of cells of end zone cells Vext advantageously divided on the two ends of the stack of these cells.

After the voltages Vcent and Vext have been measured for each group on several cells 4 and each cell of a group produced close curves forming a bundle of curves, the control computer then establishes an average for each curve bundle in order to establish the average value of the temperature of each group.

At the starting of the fuel cell and before the time t1 the voltage Vcent is greater than the voltage Vext, the central cells heat up more rapidly by the electrochemical reaction and must transmit their heat to the end cells by the circulation of the heat-conveying fluid in an alternating mode of operation in order to homogenize the temperature of the stack of these cells.

Then, when the temperature of the unit of cells 4 rises, the alternating circulation of the heat-conveying fluid tends to heat the end cells more than the central cells.

Now, a temperature rise of the cells 4 up to a certain threshold activates the electrochemical reaction and their voltage V increases, and above this threshold a supplementary rise of the temperature brings about a dehydration of the electrolyte and a drop of the voltage V.

At the time t1 it is determined that the central cells have a voltage Vcent that on the one hand starts to decrease and on the other hand is exceeded by the voltage Vext of the end cells. It is then necessary to deactivate the alternating operating mode and activate the continuous operating mode by stopping the secondary alternating circulation pump 30 and switching the three-way valves 10, 16 and starting the main continuous circulation pump 6.

There is then an arrival of cold fluid that comes to be mixed with the part of hot fluid of the secondary circuit contained in the cells 4. After a certain lowering of the temperature of the cells 4 the three-way valves 10, 16 can again be switched in order to put the secondary circuit back in operation and raise the general temperature of its fluid.

Thus, a regulation of the temperature of the cells 4 is brought about in a simple manner by the frequency of the switches, which permits an optimization of the progressive rise of temperature of the entire cooling system as well as the operating point of these cells.

Finally, for a nominal operating temperature of the cooling system comprised, for example between 20 and 80° C. for a fuel cell with a polymeric solid electrolyte and in particular between 60 and 80° for vehicle applications, the cooling circuit can be maintained in a continuous manner in the main circuit.

Figure 3:
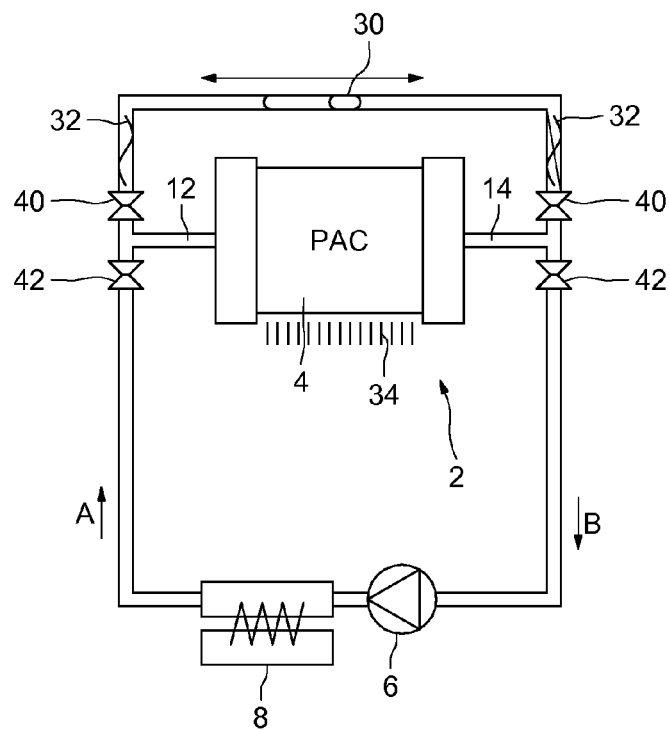
FIGS. 3 to 5 show diagrams of variations of the cooling system.

FIG. 3 shows a variant of the cooling system in which the three-way valve is replaced on each side of the cells 4 by a two-way valve of the main circuit 42 and a two-way valve of the secondary circuit 40 that are arranged in the proximity of the connection of these two circuits.

For the continuous operating mode the two valves of the secondary circuit 40 are closed and the two valves of the main circuit 42 are open in such a manner as to establish only this main circuit. And for the alternating operating mode the two valves of the main circuit 42 are closed and the two valves of the secondary circuit 40 are open in such a manner as to establish only this secondary circuit.

Figure 4:
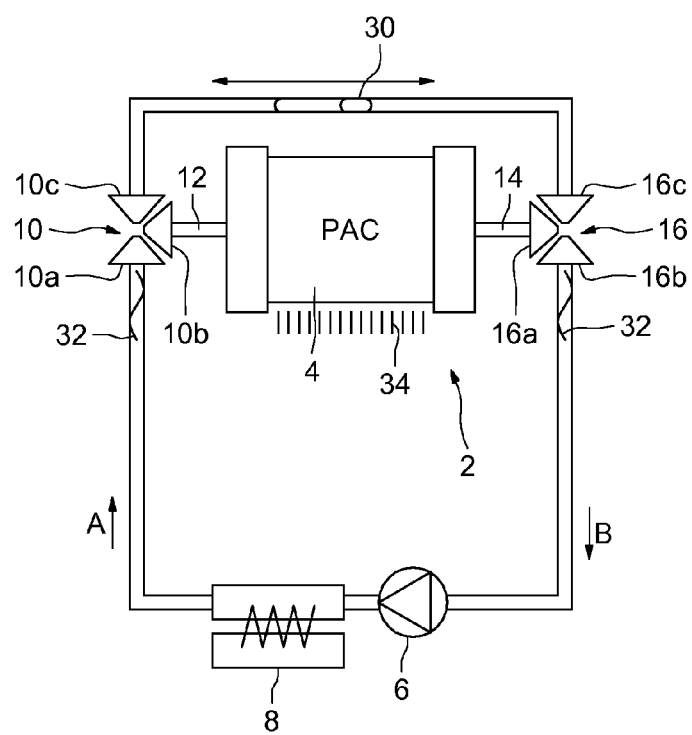

FIG. 4 shows a variant of the cooling system shown in FIG. 1 in which the static mixers 32 are arranged in the main circuit in the proximity of the three-way valves 10, 16.

Figure 5:
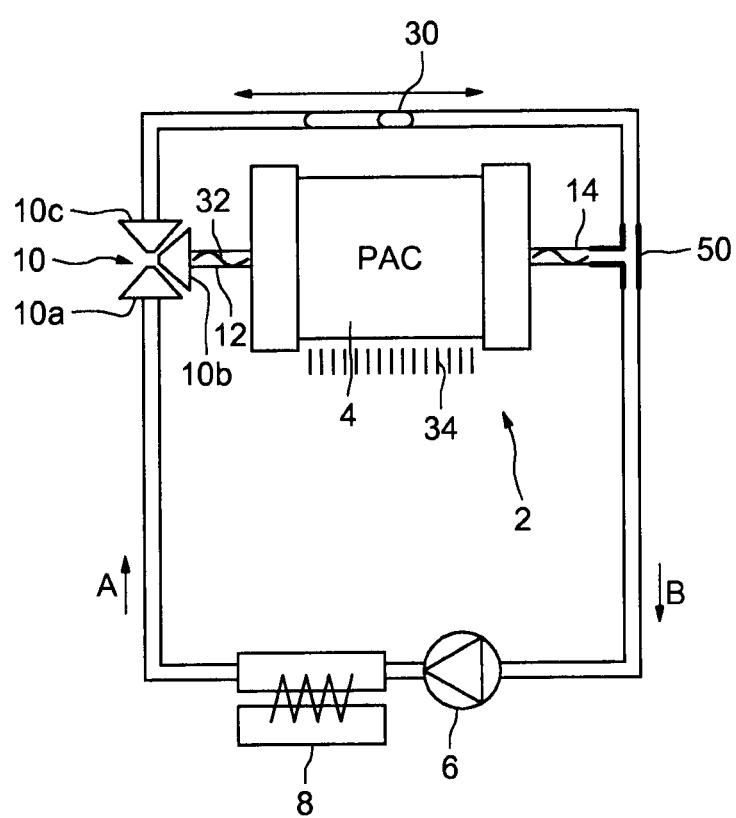

FIG. 5 shows a variant of the cooling system shown in FIG. 4 in which the static mixers 32 are arranged directly at the discharge of the cells 4 in each upstream 12 or downstream 14 conduit.

Moreover, in FIG. 5, the three-way valve arranged on the downstream conduit 14 is replaced by a connector with three open ports 50 that connects the three ways of the circuit together in a permanent manner.

The single three-way valve 10 then by itself controls the circulation of the fluid in an alternating manner in the main circuit or the secondary circuit on the upstream side 12 of the cells 4 and the three-way connector 50 closes this circuit on the downstream side 14.

As a variant, the three-way valve could be arranged on the downstream side 14 and the connector with the three open ports 50 on the upstream side 12.

The fuel cell comprising a cooling system in accordance with the invention can serve for an automobile vehicle in order to deliver an electrical current used for the traction of the vehicle. It can also serve for all stationary applications, in particular for realizing electricity-generating groups for which a rapid temperature rise is sought.

The invention claimed is:

1. A cooling system for a fuel cell comprising a main circuit and a secondary circuit for a heat-conveying fluid; the main circuit comprising a main circulation pump, a heat exchanger with the outside, an upstream conduit in fluid communication with cells of the fuel cell on one side of the fuel cell, and a downstream conduit in communication with the cells of the fuel cell on a second side of the fuel cell in order to return the heat conveying fluid from the fuel cell to the main pump; said secondary circuit comprising a secondary circulation device and said upstream and downstream conduits, said secondary circulation device bringing about an alternating circulation of the fluid and being connected in parallel to the main circuit on the upstream and downstream conduits, said cooling system further including one or more controlled valves operable to permit establishment of an independent operation of the main circuit or of the secondary circuit; wherein the secondary circulation device is a pump comprising a cylinder arranged in series in a conduit, the cylinder comprising a piston delimiting two chambers, activated by an alternating motion in order to displace the heat-conveying fluid of the secondary circuit with an alternating movement.

2. The cooling system according to claim 1, wherein the one or more controlled valves comprise a single three-way valve arranged on the upstream conduit or the downstream conduit in order to direct the fluid to the main circuit or to the secondary circuit.

3. The cooling system according to claim 1, wherein the one or more controlled valves comprise two three-way valves arranged on each of the upstream and downstream conduits of the cells in order to direct the fluid to the main circuit or to the secondary circuit.

4. The cooling system according to claim 1, wherein the one or more controlled valves comprise one two-way valve on each of the upstream conduit or downstream conduit arranged toward the main circuit and one two-way valve arranged toward the secondary circuit.

5. The cooling system according claim 1, wherein static mixers are arranged in the fluid circuit in the proximity of the cells.

6. A method for the operation of a cooling system in accordance with claim 1, wherein the process comprises a step of controlling the frequency (F) of the switching of the one or more controlled valves as a function of the development of the temperature of the cells in order to alternatively establish the main circuit or the secondary circuit.

7. The operating method according to claim 6, characterized wherein the switching frequency (F) is calculated for a given intensity of current delivered by the cells as a function of the development of the voltage (V) on the terminals of these cells.

8. The operating method according to claim 7, comprising measuring two voltages (Vext, Vcent) on the terminals of two groups of cells, one group located in a central zone of the stack of cells and the other group in the end zones of the stack of cells, the method comprising switching the one or more controlled valves in order to establish the main circuit with the continuous operation mode when the voltage of the central cells (Vcent) is exceeded by the voltage of the end cells (Vext).

9. An electricity-generating group with a fuel cell comprising the cooling system of claim 1.

10. An electric vehicle comprising a fuel cell delivering an electric current used for traction, wherein the fuel cell comprises a cooling system of claim 1.

11. The cooling system of claim 1 wherein said controlled valves are controlled to establish the secondary circuit if the cell temperature is below a threshold of 0° C.

12. The method of claim 6 wherein said method is activated when the temperature of the cell is below a threshold of 0° C.

* * * * *